United States Patent Office 2,827,356
Patented Mar. 18, 1958

2,827,356

ANTHRAQUINONE DYESTUFFS

Victor S. Salvin, Irvington, and Ruth A. Walker, Summit, N. J., assignors to Celanese Corporation of America, New York, N. Y., a corporation of Delaware No Drawing. Application October 20, 1952
Serial No. 315,825

3 Claims. (Cl. 8—25)

This application is a continuation-in-part of our application Serial No. 271,293, filed February 12, 1952, now abandoned.

This invention relates to certain valuable anthraquinone dyestuffs suitable for the dyeing of cellulose acetate and other organic derivative of cellulose textile materials in desirable blue shades, and to an improved process for the production of said dyestuffs.

It is well known that cellulose acetate and other organic derivative of cellulose textile materials which are dyed in certain blue shades, undergo undesirable changes in shade when exposed to acid fumes such as those formed by the combustion of coal, gas, etc. This change in shade is known as gas or acid fading and has long been a troublesome problem. Although most frequently encountered in connection with dyed cellulose acetate or other organic derivative of cellulose textile materials, the problem is by no means entirely limited to said materials. Regardless of where the problem is encountered, however, it is a serious one and a great deal of research effort has been expended in order to ascertain how it can be controlled. This effort has been directed not only to the development of efficient and effective acid fading inhibiting agents which may be applied to the dyed textile materials as a protective measure, but also to the synthesis of new anthraquinone dyestuffs which possess an innate, specific resistance to acid fading. Promising results have been obtained in both directions and commercial applications of these developments have been made. One very useful group of anthraquinone dyestuffs exhibiting a very outstanding degree of resistance to acid fading is obtained by reacting a hydroxy-substituted polynitro-anthraquinone, wherein at least one of the nitro groups is para to a hydroxy, in a melt with an organic primary amine, preferably, an aromatic primary amine, and under such conditions that replacement of only one of the nitro groups by an amino group takes place. Careful control of the reaction temperature is quite important, together with the presence of some water in the reaction mixture. These dyestuffs dye cellulose acetate or other organic derivative of cellulose textile materials in blue shades which are not only of extreme fastness to acid fading but are fast to light as well. There are, however, certain drawbacks to this process, one of which is the necessity for very careful and accurate temperature control. Another drawback to this process is the inability to cause the reaction to proceed with certain amines despite the use of long reaction periods.

It is, therefore, an important object of this invention to provide a process for the production of said anthraquinone dyestuffs wherein the problem of close and accurate temperature control may be eliminated.

Another object of this invention is to provide a process for the production of novel anthraquinone dyestuffs dyeing cellulose acetate or other organic derivative of cellulose textile materials in blue shades of improved affinity and of an unusual degree of resistance to acid fading.

A further object of this invention is to provide novel anthraquinone dyestuffs and textile materials dyed therewith.

Still another object of this invention is to provide novel anthraquinone dyestuffs yielding stable dyebaths which may be applied over a wide range of pH values.

Other objects of this invention will appear from the following detailed description.

We have now found that anthraquinone dyestuffs of substantially improved characteristics may be obtained by condensing a hydroxy-substituted polynitro-anthraquinone with an organic primary amine if the condensation reaction is carried out in solution in a neutral, organic solvent for the reactants employed. Preferably, the reaction is carried out at temperatures of 110 to 145° C. Higher reaction temperatures do not yield dyestuffs whose dyeing properties are as desirable as those obtained within the temperature range specified. It is desirable to employ as solvent a compound having a boiling point within this range so that by maintaining the reaction mixture under reflux, the problem of close temperature control is very satisfactorily solved. The solvent should advantageously also be miscible with water so as to facilitate isolation and purification of the product. However, satisfactory results are also obtained with solvents that are not miscible with water and have a boiling point above the range specified. The use of a solvent such as the monomethyl ether of ethylene glycol, for example, is ideal since it has a boiling point of about 125° C. and is miscible with water. Examples of other suitable solvents are ethylene glycol monoethyl ether acetate, ethyl lactate, butyl alcohol, toluene and ethylene glycol mono-ethyl ether.

Moreover, in addition to solving the problem of close and accurate temperature control, our novel solvent process results in other and quite unexpected advantages. Thus, for example, the anthraquinone dyestuffs obtained by our novel solvent reaction process are found to dye cellulose acetate and other organic derivative of cellulose textile materials in shades which are somewhat cleaner and brighter than the corresponding dyestuffs when produced by the melt process referred to hereinbefore and in the presence of water. In addition, the dyestuffs prepared by our novel solvent process are found to be more neutral in their tendency to change in color under artificial light and, generally, to possess a somewhat greater affinity for cellulose acetate or other organic derivatives of cellulose textile materials than the same dyestuffs prepared by the melt process. In some cases, they also exhibit an improved resistance to gas fading. Moreover, our novel solvent process enables the production of certain dyestuffs that could not be prepared by the melt process employed heretofore. The reactants are preferably maintained under reflux conditions for from 6 to 18 hours to ensure a desirable product. The ability to vary the time of reaction over such a wide range represents another important advantage of the process disclosed herein over the melt process wherein the time of reaction had to be controlled within close limits.

A noticeable improvement in the general characteristics and dyeing properties of said anthraquinone dyestuffs is further observed when our solvent process is carried out in an inert atmosphere, such as nitrogen. This desirable reaction condition may be readily achieved by the expedient of bubbling nitrogen or other inert gas such as carbon dioxide through the refluxing reaction mixture in the reaction vessel so as to flush out any oxygen which may be present.

As examples of hydroxy-substituted polynitro-anthraquinone compounds which may be reacted to form said valuable dyestuffs in accordance with our novel solvent process, there may be mentioned, for example, 4,8-dinitro-anthrarufin, 4,8-dinitro-anthrachrysone, 4,5-dinitrochrysazin, 1,6-dihydroxy-4,5-dinitro-anthraquinone, 1,7-dihydroxy, 4,5-dinitro-anthraquinone, etc. These hydroxy substituted polynitro-anthraquinone compounds are reacted with substituted or unsubstituted primary aromatic amines. Examples of suitable amines for this purpose include aniline, toluidine, 2,6-dimethyl aniline, amino-ethyl benzene, amino-acetophenone, amino-cresol, amino-phenol, sulfanilamide, amino-benzoic acid and esters thereof, amino benzoamides such as m-amino benzamide, amino acetanilides such as p-amino acetanilide and p-amino methylacetanilide and other amino alkyl anilides, anisidine, phenetidine, 2,5-dimethoxy aniline, phenylene diamine, naphthylamine, and 6-amino-1,3-benzo dioxan. In general, when a substituted amine is employed, the best results, with respect to gas-fading resistance of the dyestuff, are obtained when the substituent is in the meta position to the amino group.

A particularly valuable and novel class of dyestuffs is obtained when the hydroxy substituted polynitro anthraquinones are reacted with primary aromatic amines of the formula

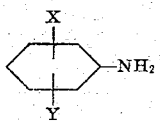

wherein X is $(C_nH_{2n})OR$ or $O—(C_nH_{2n})OR$, $n$ being a small integer, i. e. 1, 2, 3, 4 etc., and R being hydrogen, alkyl, hydroxyalkyl or hydroxyalkoxy and Y is hydrogen, alkyl, alkoxy, hydroxy, halogen, carboxy, carbethoxy, cyano, amino, alkylamino, hydroxyalkyl or hydroxyalkoxyalkyl. Advantageously, either at least one of X or Y (when Y is other than hydrogen) or both X and Y are positioned meta to the amino group. These aromatic amines may be substituted further in the ring or side chain if desired. Examples of primary amines of this formula suitable for the preparation of the dyestuffs of this invention include m-amino-benzyl alcohol, 2-methyl-5-amino benzyl alcohol, 4-methyl-3-amino benzyl alcohol, m-amino phenylmethyl carbinol, 2-methoxy-5-amino benzyl alcohol, 4-methoxy-3-amino benzyl alcohol, 4-methylol-5-amino benzyl alcohol, 2-amino benzyloxy ethanol, p-amino phenyl ethyl alcohol, m-amino phenoxy ethanol, and p-amino phenoxy ethanol. The dyestuffs prepared with these aromatic amines not only have the high resistance to acid fading of dyestuffs prepared with the other listed aromatic amine, but possess a better dispersability so that dyebaths containing the same may be prepared more readily. They also exhibit better jig dyeing properties with respect to the strike and pile on of the dyestuffs which properties are highly important from commercial considerations. In addition, they have a smaller artificial light change, i. e. they have substantially the same shade when viewed under artificial (tungsten) light as when viewed in daylight. This is important not only in itself, but because any tendency towards artificial light change magnifies the effect of changes caused by gas fading. Advantageously, the amine is employed in a molecular excess in carrying out the reaction and this excess is preferably such that the reaction mixture contains from 3 to 6 mols of the amine employed for each mol of the hydroxy-substituted polynitro-anthraquinone compound.

A particularly suitable dyestuff for cellulose acetate is the 1,5-dihydroxy-4-(methyl carbinol)-anilino-8-nitro-anthraquinone produced by the condensation of 4,8-dinitroanthrarufin with amino-phenyl methyl carbinol. This dyestuff has good affinity for cellulose acetate and a good strike and pile on during the dyeing process and yields a blue dyed fabric having outstanding resistance to acid fading. However, this excellent dye has certain defects, in that the pH range in which it may be applied is limited and the stability of dyebaths made therefrom is not as high as desired. The isomeric 1,8-dihydroxy-4-(methyl carbinol)-anilino-5-nitroanthraquinone produced by the condensation of 4,5-dinitrochrysazine with aminophenyl methyl carbinol is also an excellent dyestuff yielding blue fade-resistant cellulose acetate fabrics, but this dyestuff exhibits an affinity for cellulose acetate only within a very restricted pH range, so that slight changes in the pH of the dyebath greatly reduce its affinity and pile-on.

We have found that a mixture of 1,5-dihydroxy-4-(methyl carbinol)-anilino-8-nitro anthraquinone and 1,8-dihydroxy-4-(methyl carbinol)-anilino-5-nitro anthraquinone, in which each component constitutes at least about 25% of the mixture, dyes cellulose acetate and other organic derivative of cellulose material in fade-resistant blue shades, and that such a mixture exhibits an unexpectedly excellent affinity, pile on, and stability over a wide range of pH values. This dye mixture may be prepared by separately reacting 4,8-dinitro anthrarufin and 4,5-dinitro chrysazine with aminophenyl methyl carbinol and then mixing the two reaction products, or, more cheaply, by reacting a mixture of 4,8-dinitro anthrarufin and 4,5-dinitro chrysazine with the aminophenyl methyl carbinol. With both methods the results are substantially the same.

For dyeing cellulose acetate textile materials our novel dyestuffs may be applied in the form of a solution in an organic solvent or as an aqueous dispersion prepared with the aid of a dispersing agent or protective colloid. Examples of suitable dispersing agents are sulfonated ricinoleic acid, sulfated lauryl alcohol or soap. We prefer to dissolve our dyestuff mixture in a solvent, preferably a water-miscible solvent such as dioxan, or acetone, and then to warm up the resulting solution and disperse it in a hot aqueous solution containing a dispersing agent.

The dyeing temperature may be varied widely. It is found that dyeings obtained at a lower temperature, such as 65° C., are somewhat lighter and slightly greener than dyeings obtained at higher temperatures, such as 85° C.

In order further to illustrate the novel process of our invention, the following examples are given:

*Example I*

33 parts by weight (0.1 mol) of 4,8-dinitro-anthrarufin are dissolved in about 480 parts by weight of the monomethyl ether of ethylene glycol and 47 parts by weight (0.5 mol) of aniline are added. The mixture formed is heated to reflux temperature and maintained under reflux for 18 hours. The reaction product formed is cooled to room temperature and then poured into 1500 parts by weight of a 1.5% by weight aqueous solution of hydrochloric acid. A precipitate is formed and, after being filtered, is washed with water until the washings are colorless. The washed precipitate is then dissolved in 1600 parts by weight of ethyl alcohol and reprecipitated by adding the alcohol solution to 1000 parts by weight of a 20% by weight aqueous solution of hydrochloric acid. The precipitate which forms is again washed with water until the wash water is colorless. The solid material remaining is slurried in 2000 parts by weight of a 2.5% by weight aqueous solution of sodium carbonate and then filtered off. This wash step is repeated until all of the brown colored material which may be present is removed. The dyestuff is then filtered, washed with water until neutral and dried. The product obtained comprises 1,5-dihydroxy-4-anilino-8-nitro-anthraquinone.

A dyebath suitable for the dyeing of cellulose acetate textile materials is obtained by dissolving 0.05 part by weight of the dried anthraquinone compound in 3 parts by weight of dioxan and dispersing this colored solution in 800 parts by weight of an aqueous solution containing 2 grams of Turkey red oil, 0.2 gram of green soap and 0.5 gram of potassium pyrophosphate per liter. The textile material is dyed at 80° C. by being immersed in the disperse dyebath for 1 hour.

The dyestuff 1,5-dihydroxy-4-anilino-8-nitroanthraquinone dyes cellulose acetate in a somewhat reddish blue shade, and has an excellent affinity for the cellulose acetate material. The dyed material has a gas fading resistance of 5 A. A. T. C. C. units; the very slight change in shade which may be noted after this severe test exposure is even less than that which is observed in the case where said dyestuff is synthesized by the melt method.

When the solvent process described above, reacting 4,8-dinitro-anthrarufin with aniline, is carried out in an atmosphere of nitrogen, the dyestuff obtained dyes cellulose acetate in cleaner, brighter and much greener shades than in the case of the dyestuff which is obtained by a straight solvent process where oxygen is not excluded. While the affinity remains about the same, the gas fading resistance is noticeably increased.

*Example II*

33 parts by weight (0.1 mol) of 4,8-dinitro-anthrarufin are dissolved in about 480 parts by weight of the monomethyl ether of ethylene glycol and 54 parts by weight (0.4 mol) of p-aminoacetophenone are added. The resulting solution is heated to reflux temperature for 18 hours. After being cooled to room temperature, the reaction mixture is poured into 1500 parts by weight of a 1.5% aqueous solution of hydrochloric acid. The precipitate formed is then purified in accordance with the procedure given in Example I. The dyestuff which is obtained, 1,5-dihydroxy-4-p-acetyl-anilino-8-nitro-anthraquinone, dyes cellulose acetate textile materials in a red-blue shade, has a good affinity for said materials and the dyed fabric has a resistance to acid fading of 5 A. A. T. C. C. units. When a melt process of preparing this dyestuff is attempted, no reaction is observed.

*Example III*

33 parts by weight (0.1 mol) of 4,8-dinitro-anthrarufin are reacted with 61.5 parts by weight (0.5 mol) of m-amino-benzyl alcohol in solution employing the monomethyl ether of ethylene glycol as solvent under reflux for 18 hours. The dyestuff obtained from this reaction, after precipitation and further purification as described in Example I, dyes cellulose acetate in a very desirable blue color which is slightly on the greenish side, with the dyestuff exhibiting good affinity for the textile material. Only a very slight change in tone is observed when a sample of the dyed fabric is subjected to 5 units of exposure in accordance with the standard A. A. T. C. C. test for acid fading. The green-blue shade obtained with this dyestuff when prepared by the above solvent method is distinctly different from the reddish-blue shade which is obtained when this dyestuff is prepared by the melt process. In addition, the solvent process is found to yield a dyestuff having an improved resistance to acid fading compared to the corresponding dyestuff prepared by the melt process.

When m-amino-benzyl alcohol and 4,8-dinitro-anthrarufin are reacted under reflux in accordance with the above solvent process but under such conditions that a blanket of nitrogen is maintained over the reactants, e. g. by bubbling a current of nitrogen through the reaction vessel, a dyestuff which dyes cellulose acetate in even a greener blue shade is obtained. The 1,5-dihydroxy-4-(m-hydroxymethyl)-anilino-8-nitro-anthraquinone thus obtained also exhibits a noticeably greater affinity for cellulose acetate than the ordinary solvent-synthesized dyestuff. The compound 1,5-dihydroxy-4-(m-hydroxymethyl)-anilino-8-nitro-anthraquinone is a novel dyestuff hitherto unknown to the art.

In a similar manner, 4,8-dinitro-anthrarufin may be reacted with m-anisidine in solution in the mono-methyl ether of ethylene glycol with or without a nitrogen atmosphere blanketing the reaction mixture to yield the dyestuff 1,5-dihydroxy-4-(m-methoxy)-anilino-8-nitro-anthraquinone which dyes cellulose acetate in a blue shade having a resistance to acid fading of 5 units. A cleaner and brighter shade is obtained when the reaction takes place in a nitrogen atmosphere.

The dyestuff 1,5-dihydroxy-4-(m-hydroxy)-anilino-8-nitro-anthraquinone is obtained by reacting 4,8-dinitro-anthrarufin with m-amino-phenol in solution in the mono-methyl ether of ethylene glycol. This dyestuff dyes cellulose acetate in a desirable green-blue shade of 5 units resistance to acid fading. A brighter shade and a dyestuff of somewhat greater affinity is obtained when the condensation is carried out under nitrogen.

*Example IV*

33 parts by weight (0.1 mol) of 4,8-dinitro-anthrarufin are dissolved in about 480 parts by weight of the monomethyl ether of ethylene glycol and 68 parts by weight (0.5 mol) of m-amino phenyl methyl carbinol are added. The resultant solution is heated to reflux temperature for 16 hours. After being cooled to room temperature, the reaction mixture is poured into 1500 parts by weight of 1.5% aqueous solution of hydrochloric acid. The precipitate formed is then purified in accordance with the procedure given in Example I. The dyestuff which is obtained, 1,5-dihydroxy-4-(m-methyl carbinol)-anilino-8-nitro-anthraquinone, dyes cellulose acetate materials in a blue shade, which is slightly on the greenish side, has good affinity for said materials, a good strike and pile on during the dyeing process, and the dyed fabric has a resistance to acid fading of 5 A. A. T. C. C. units.

*Example V*

The process of Example IV is repeated, substituting 4,5-dinitro chrysazine for the 4,8-dinitro anthrarufin. The resulting dyestuff, 1,8-dihydroxy-4-(m-methyl carbinol)-anilino-5-nitroanthraquinone, when applied to cellulose acetate yields a blue dyeing, which is slightly on the greenish side and which has a resistance to acid fading of 5 A. A. T. C. C. units.

*Example VI*

This example is carried out to compare the dyestuffs of Examples IV and V with mixtures of these dyestuffs. For convenience, the dyestuff of Example IV is designated as the 1,5-dihydroxy isomer and the dyestuff of Example V as the 1,8-dihydroxy isomer. Dyebaths are prepared from the 1,5-dihydroxy isomer, the 1,8-dihydroxy isomer, and a series of mixtures of these two isomers, containing 25%, 50% and 75% of the 1,5-dihydroxy isomer with the remainder being the 1,8-dihydroxy isomer, in the following manner:

10 grams of the dyestuff or dyestuff mixture are dissolved in 1 liter of dioxan and heated to 80° C. The resulting hot solution is then added slowly to a solution made by the addition of 10 liters of water at 90° C. to 500 cc. of a mixture of dispersing agents consisting of 4 parts by volume of Turkey red oil, 2 parts by volume of a 10% solution of green soap in water and 1 part by volume of a 50% solution of potassium pyrophosphate in water. After the addition of more water to bring its volume up to 50 liters, the resulting dyebath is filtered and further diluted with water to bring its volume up to 80 liters.

Each of the dyebaths is used to dye 1000 grams of cellulose acetate textile material. It is found that the 1,5-dihydroxy isomer has good affinity and pile on at dyebath pH values ranging from about 8.5 to about 9.0. Above about pH 9.0 there is a loss of affinity while below about pH 8.5 the dyestuff tends to precipitate out of the dyebath. The effective pH range for the 1,8-dihydroxy isomer is even smaller; slight pH changes on either side of the optimum value of about 8.7 cause loss of affinity or precipitation. However, the mixed isomers have good affinity and pile-on over a wide range of pH values, show practically no precipitation, and have superior stability.

At pH 8.5, the 1,8-dihydroxy isomer yields a dyeing which is only about one third as heavy as the deep bright blue dyeing from the 1,5-dihydroxy isomer. On this basis it would be expected that when mixtures of 1,5- and 1,8-isomers were employed at pH 8.5 the depth of shade would depend on the proportions of the two isomers. Surprisingly, it is found that all of the mixtures, even those in which only 25% of the dyestuff is the 1,5-isomer, yield dyeings which are just as heavy as those obtained from the 1,5-isomer alone.

At pH 7.5, 6.5 and 5.5 the results are even more striking, since all of the mixtures show no precipitation and yield heavy dyeings, while the dyebaths made from the 1,5- and 1,8-isomers alone are unsuitable at these pH values and yield only light shades.

Sometimes, when a dyebath is used for long periods, even at its most desirable pH, part of the dyestuff precipitates, causing dark smudges on the fabric. Dyebaths made from mixtures of the 1,5- and 1,8-dihydroxy isomers are much more resistant to such precipitation than those made from the individual isomers.

Mixing the 1,5- and 1,8-dihydroxy isomers does not cause any decrease in fastness to light or to acid fading.

*Example VII*

The process of Example IV is repeated, substituting 33 parts by weight of a mixture of 65% by weight of 4,8-dinitroanthrarufin and 35% by weight of 4,5-dinitrochrysazine for the 33 parts of 4,8-dinitroanthrarufin of Example IV. The resulting dyestuff mixture has substantially the same properties as the dyestuff mixtures employed in Example VI.

*Example VIII*

The process of Example IV is repeated, substituting a mixture of 16.5 parts by weight of 4,8-dinitro anthrarufin and 16.5 parts by weight of 4,5-dinitro-chrysazine for the 33 parts of 4,8-dinitroanthrarufin, and replacing the 68 parts by weight of m-amino phenyl methyl carbinol by a mixture of 34 parts by weight of beta-(p-amino phenyl)ethanol and 34 parts by weight of m-amino phenyl methyl carbinol. The resulting dyestuff mixture has properties similar to those of the dyestuff mixtures employed in Example VI.

*Example IX*

The process of Example IV is repeated, substituting 69 parts by weight (0.5 mol) of 2-methyl-5-amino benzyl alcohol for the m-amino-phenyl methyl carbinol. The dyestuff which is obtained, 1,5-dihydroxy-4-(3-hydroxymethyl-4-methyl)-anilino-8-nitro-anthraquinone, dyes cellulose acetate in a good blue shade and the dyed fabric has a resistance to acid fading of 5 A. A. T. C. C. units.

*Example X*

The process of Example IV is repeated, substituting 69 parts by weight (0.5 mol) of 4-methyl-3-amino benzyl alcohol for the m-amino phenyl methyl carbinol. The dyestuff which is obtained, 1,5-dihydroxy-4-(2-methyl-5-hydroxymethyl)-anilino-8-nitro-anthraquinone, dyes cellulose acetate in a good blue shade and the dyed fabric has a resistance to acid fading of 5 A. A. T. C. C. units.

*Example XI*

The process of Example IV is repeated, substituting 60 parts by weight (0.4 mol) of m-amino acetanilide for the m-amino phenyl methyl carbinol. The dyestuff which is obtained, 1,5-dihydroxy-4-(m-acetyl amino)-anilino-8-nitro-anthraquinone, dyes cellulose acetate in a good blue shade and the dyed fabric has good resistance to acid fading.

*Example XII*

The process of Example IV is repeated, substituting 68 parts by weight (0.5 mol) of m-amino-benzamide for the m-amino phenyl carbinol. The dyestuff which is obtained, 1,5-dihydroxy-4-carbonic amide)-anilino-8-nitro-anthraquinone, dyes cellulose acetate in a good blue shade and the dyed fabric has a resistance to acid fading of 5 A. A. T. C. C. units.

While the dyestuffs prepared in accordance with our novel process have been more particularly described in connection with their use for the dyeing of cellulose acetate, they may also be employed for the dyeing of other organic derivatives of cellulose. Examples of said other organic derivatives of cellulose are cellulose esters such as cellulose propionate, cellulose butyrate, cellulose acetate-propionate and cellulose acetate butyrate and cellulose ethers such as ethyl cellulose and benzy cellulose.

It is to be understood that the foregoing detailed description is given merely by way of illustration and that many variations may be made therein without departing from the spirit of our invention.

Having described our invention, what we desire to secure by Letters Patent is:

1. An anthraquinone dyestuff mixture comprising about 1 to 3 parts of 1,5-dihydroxy-4-(m-methyl carbinol)-anilino-8-nitro anthraquinone and 1 to 3 parts of 1,8-dihydroxy-4-(m-methyl carbinol)-anilino-5-nitro anthraquinone.

2. An anthraquinone dyestuff comprising a mixture of about 25 to 75% of 1,5-dihydroxy-4-hydroxyethyl-anilino-8-nitro-anthraquinone and about 75 to 25% of 1,8-dihydroxy-4-hydroxyethylanilino-5-nitro-anthraquinone.

3. The dyestuff of claim 2 in which the hydroxyethyl radicals comprise both alpha-hydroxyethyl and beta-hydroxyethyl radicals.

References Cited in the file of this patent

UNITED STATES PATENTS

| | | |
|---|---|---|
| 2,060,186 | Felix et al. | Nov. 10, 1936 |
| 2,341,891 | Wuertz | Feb. 15, 1944 |
| 2,342,191 | Grossman | Feb. 22, 1944 |
| 2,480,269 | Seymour et al. | Aug. 30, 1949 |
| 2,485,197 | Grossman | Oct. 18, 1949 |
| 2,506,020 | Grossman | May 2, 1950 |
| 2,537,975 | Dickey | Jan. 16, 1951 |
| 2,641,602 | Straley et al. | June 9, 1953 |
| 2,713,060 | Salvin | July 12, 1955 |
| 2,726,251 | Dickey et al. | Dec. 6, 1955 |
| 2,777,863 | Dickey et al. | Jan. 15, 1957 |

FOREIGN PATENTS

| | | |
|---|---|---|
| 966,605 | France | Mar. 1, 1950 |